_United States Patent_ [19]

Martens

[11] Patent Number: 4,878,835
[45] Date of Patent: Nov. 7, 1989

[54] CERAMIC BURNER FOR PARTIAL OXIDATION OF A HYDROCARBON-CONTAINING FUEL

[75] Inventor: Franciscus J. A. Martens, Amsterdam, Netherlands

[73] Assignee: Shell Oil Company, Houston, Tex.

[21] Appl. No.: 223,813

[22] Filed: Jul. 25, 1988

[30] Foreign Application Priority Data

Sep. 10, 1987 [GB] United Kingdom ................. 8721282

[51] Int. Cl.$^4$ ............................................... F23C 7/00
[52] U.S. Cl. .................................... 431/187; 431/161
[58] Field of Search ............... 431/181, 187, 158, 347, 431/326, 328, 161, 166; 239/399, 418, 423

[56] References Cited

U.S. PATENT DOCUMENTS

| | | | |
|---|---|---|---|
| 2,489,244 | 11/1949 | Stalego | 431/158 |
| 3,322,180 | 5/1967 | Perry | 431/347 |
| 4,364,726 | 12/1982 | Förster et al. | 431/181 X |
| 4,676,744 | 6/1987 | Wray et al. | 431/181 |

_Primary Examiner_—Margaret A. Focarino
_Attorney, Agent, or Firm_—Ronald R. Reper

[57] ABSTRACT

A protruding mantle separates burner internals from the hot gasification environment. The mantle is cooled by at least one of the feedstreams. The lining can be made of ceramics such as silicon carbide and/or silicon nitride. In order to lower thermo-mechanical stress the lining is thin-walled.

7 Claims, 1 Drawing Sheet

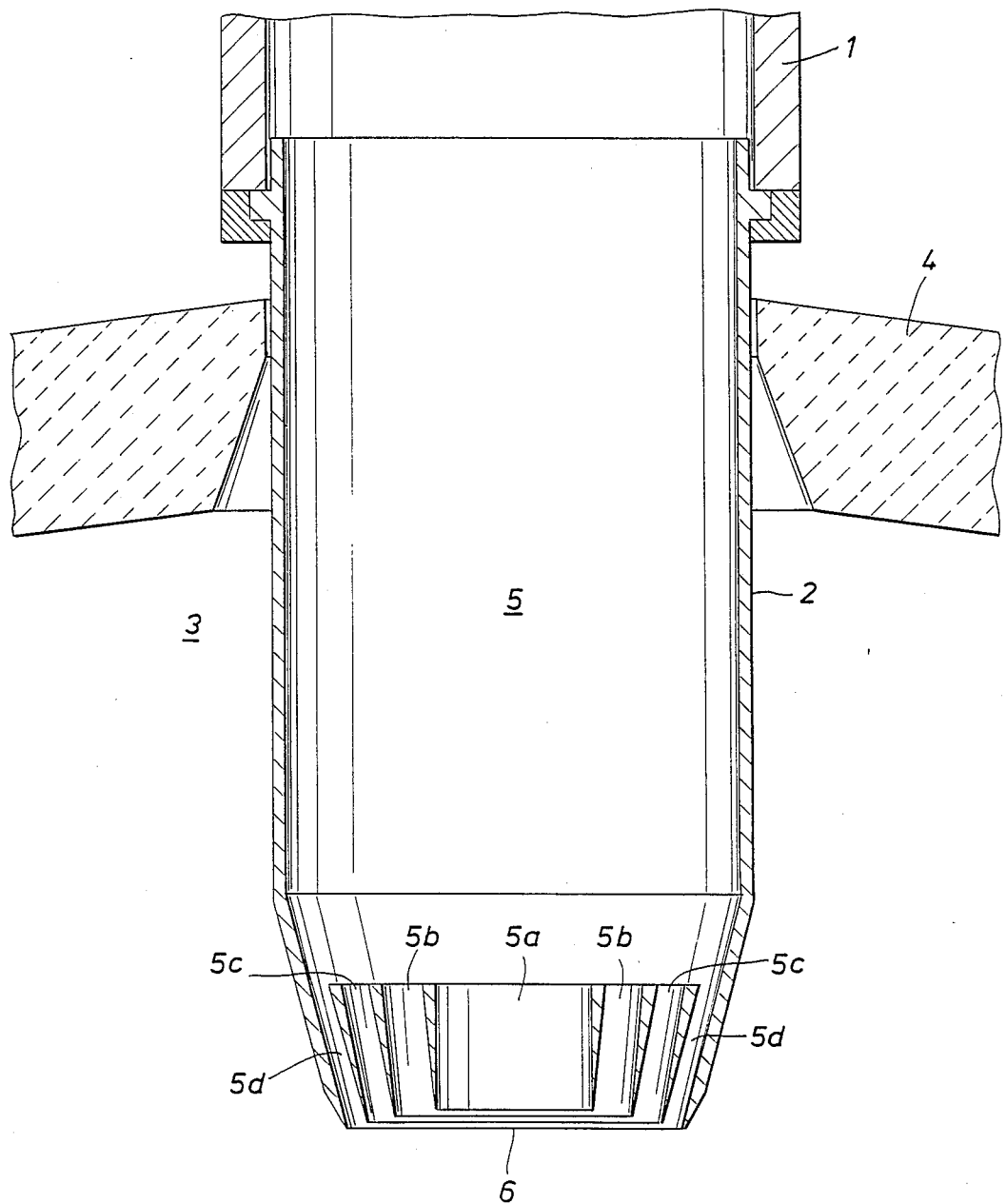

CERAMIC BURNER FOR PARTIAL OXIDATION OF A HYDROCARBON-CONTAINING FUEL

BACKGROUND OF THE INVENTION

The invention relates to a burner for partial oxidation of a hydrocarbon-containing fuel.

In particular, the invention relates to a burner for partial oxidation of a hydrocarbon-containing fuel wherein an oxygen-containing gas and a hydrocarbon-containing fuel are supplied to a gasification zone through an arrangement of passages or channels for fuel and oxygen-containing gas, and wherein autothermically a gaseous stream containing synthesis gas is produced under appropriate conditions.

The oxygen-containing gas is usually air or pure oxygen or a mixture thereof. In order to control the temperature in the gasification zone a moderator gas (for example, steam or carbon dioxide) can be supplied to said zone.

Further, the gasification process can be carried out at any suitable pressures, for example at 0.1–12 MPa.

In particular, the invention relates to a burner as described in the foregoing, wherein a liquid is suitable as a fuel.

For example, (heavy) residue feedstock is suitable to be used as a fuel. Further, methane can be used as a fuel.

It is already known to apply water-cooled burners in partial oxidation processes of hydrocarbon-containing fuel.

However, such water-cooled burners are limited in their scale-up potential. The capital expenditure and maintenance of a fail safe water-cooled system is significant and scale-up is important in order to reduce cost. Further, it has appeared that in large burners problems may arise with respect to withstanding the cooling water pressure when the reactor pressure is at ambient.

It is therefore an object of the invention to provide a non-water-cooled burner which has virtually no scale-up limitations, is relatively cheap and maintenance-free.

It is another object of the invention to provide a non-water-cooled burner which can operate at severe reactor conditions and limits the heat flux from the flame in front of the burner to the reactor dome.

SUMMARY OF THE INVENTION

The present invention therefore provides a burner for the partial oxidation of hydrocarbon-containing fuel and an oxygen-containing gas, said burner comprising an arrangement of passages or channels for feeding the fuel and oxygen-containing gas and optionally a moderator to a reactor, wherein the burner further comprises a lining or thin-walled mantle of ceramics having a high thermal conductivity, said lining or mantle being mounted at one end on the burner head and the other end protruding into the reactor, and separating the said passages from the reactor environment, and wherein the outer skin of the said lining or mantle is exposed to the reactor environment whereas the inner skin of said lining or mantle, in operation of the burner, is cooled by at least one of the feed streams.

BRIEF DESCRIPTION OF THE DRAWING

The FIGURE is a longitudinal section of the front part, including the discharge end, of a burner according to the invention.

DESCRIPTION OF THE PREFERRED EMBODIMENTS

The invention will now be described by way of example in more detail by reference to the accompanying drawing, in which the figure represents schematically a sectional view of a part of a burner according to the invention.

Referring now to the figure, the burner comprises a burner head 1 which is provided with a ceramic burner lining or thin-walled mantle 2 protruding into the reactor 3 through the refractory dome 4. The lining or mantle is connected at one of its ends to the burner head in any way suitable for the purpose. The protruding lining or mantle separates the burner internals 5 from the reactor environment.

The burner internals comprise the arrangement of reactants-channels or passages (only partially shown at the burner mouth 6 for reasons of clarity).

The fuel and the oxygen-containing gas are supplied to the gasification zone through the burner-arrangement of oxygen and fuel passages. For example, the burner can comprise a concentric arrangement of oxygen and fuel passages. In such an arrangement a central channel 5a for reactant supply (fuel or oxygen) is surrounded by a first annular channel 5b for reactant supply.

The said first annular channel is surrounded by a second annular channel 5c for reactant supply and the said second channel is surrounded by a third annular channel 5d for reactant or moderator supply.

Multi-orifice burners comprising arrangements of annular concentric channels for supplying oxygen and fuel to gasification zones are known as such and will not be described in detail. However, it will be appreciated that the invention is not restricted thereto.

The oxygen-containing gas and the fuel are supplied to the gasification zone through the respective channels at specific velocities and mass distribution in order to obtain a good atomization and mixing.

According to the invention the burner internals are confined by a lining or thin-walled mantle of ceramics having a high thermal conductivity. Advantageously, this mantle is cylindrical. Such ceramic burner linings can be used successfully at severe process conditions and their scale-up potential is unlimited. In operation of the burner, the outer skin of the said mantle is exposed to the reactor environment and the inner skin is cooled by at least one of the feed streams (oxygen-containing gas, fuel, moderator). The burner fluid dynamics are selected in such a manner that a slender and short flame is obtained.

The burner protrudes in the reactor to reduce direct radiative heat transfer from the flame to the refractory dome surrounding the burner.

In operation, the flame is lifted from the burner face and the radiative heat flux to the burner lining, the internals and the refractory dome is low.

The connection between ceramic part and metal parts of the burner should allow free thermic expansion, while being gastight.

Suitable ceramics having a large heat conductivity are for example mainly, i.e., more than about 85% by weight of silicon carbide and silicon nitride having a heat conductivity of about 0.1 cal (cm) (Sec) (°C.) and 0.04 cal/(cm) (Sec) (°C.), respectively. Such materials are also sufficiently corrosion-resistant.

It will be appreciated that in order to reduce thermo-mechanical stress an advantageous wall thickness of the lining is in the range of 2 to 8 mm, advantageously about 5 mm. The mantle may be fabricated by siliconizing a shape of, e.g., silicon carbide and carbon particles bonded temporarily with carbonaceous material, or by any known procedure.

It will further be appreciated that the lining can have any dimensions suitable for the purpose. Advantageously its length and diameter are in the range of 35 to 40 cm and in the range of 12 to 16 cm respectively, whereas its protrusion into the reactor is in the range of 1 to 20 cm.

Various modifications of the present invention will become apparent to those skilled in the art from the foregoing description. Such modifications are intended to fall within the scope of the appended claims:

What is claimed is:

1. A burner for the partial oxidation of hydrocarbon-containing fuel and an oxygen-containing gas, said burner comprising a tubular burner head having a feed supply end and a discharge end, said burner head being disposed around an arrangement of a plurality of concentric tubular passages for feeding the fuel and oxygen-containing gas to a partial oxidation reactor, wherein said burner further comprises a thin-walled tubular mantle of impervious ceramics having a high thermal conductivity, said tubular mantle having an inner skin and an outer skin and being mounted at the feed supply end on the burner head and the other, discharge end, disposed to protrude into the reactor, and to separate the said tubular passages from the reactor environment, wherein the outer skin of said mantle is exposed to the reactor environment whereas the inner skin of said mantle, during operation of the burner, is cooled by at least one of the feed streams.

2. The burner as in claim 1 wherein the said ceramic mantle is mainly silicon nitride.

3. The burner as in claim 1 wherein the said ceramic mantle is mainly silicon carbide.

4. The burner as in claim 1 wherein the thickness of the wall of the ceramic mantle is in the range of 2 to 8 mm.

5. The burner as in claim 1 wherein said mantle has a length in the range of 35 to 40 cm, a diameter in the range of 12 to 16 cm, and whereas its protrusion into said reactor is in the range of 1 to 20 cm.

6. The burner as in claim 1 having in addition a concentric tubular passage immediately adjacent to said mantle for feeding a moderator to said partial oxidation reactor.

7. The burner as in claim 1 wherein said plurality of concentric passages comprises a concentric central channel for reactant supply; a first concentric annular supply channel disposed to surround said central channel for reactant supply; a second concentric annular channel for reactant supply disposed to surround said first annular channel, and a third concentric annular channel disposed to surround said second annular channel for supply of reactant or moderator.

* * * * *